(12) United States Patent
Petitgrand et al.

(10) Patent No.: US 10,338,664 B2
(45) Date of Patent: *Jul. 2, 2019

(54) CONTROL MODULE FOR DATA RETENTION AND METHOD OF OPERATING CONTROL MODULE

(71) Applicant: M2Communication Inc., Hsinchu County (TW)

(72) Inventors: Fabien Petitgrand, Hsinchu County (TW); Huang-Lun Lin, Hsinchu County (TW)

(73) Assignee: M2 COMMUNICATION INC., Zhubei (TW)

( * ) Notice: Subject to any disclaimer, the term of this patent is extended or adjusted under 35 U.S.C. 154(b) by 523 days.

This patent is subject to a terminal disclaimer.

(21) Appl. No.: 15/133,467

(22) Filed: Apr. 20, 2016

(65) Prior Publication Data

US 2017/0308307 A1    Oct. 26, 2017

(51) Int. Cl.
G06F 13/20 (2006.01)
G06F 1/3234 (2019.01)
G06F 13/42 (2006.01)
G06F 13/24 (2006.01)
G06F 13/40 (2006.01)
G06F 1/3287 (2019.01)

(52) U.S. Cl.
CPC ............ *G06F 1/3243* (2013.01); *G06F 1/325* (2013.01); *G06F 1/3287* (2013.01); *G06F 13/24* (2013.01); *G06F 13/4022* (2013.01); *G06F 13/4282* (2013.01); *Y02D 10/171* (2018.01); *Y02D 50/20* (2018.01)

(58) Field of Classification Search
CPC ............. G06F 11/1435; G06F 11/1469; G06F 12/0638; G06F 13/24; G06F 13/364; G06F 13/4022; G06F 13/404; G06F 13/4282; G06F 1/3243; G06F 1/3287; G06F 2201/84; G06F 2212/205
See application file for complete search history.

(56) References Cited

U.S. PATENT DOCUMENTS

2008/0071972 A1* 3/2008 Kimura ................... G06F 1/305
711/103

* cited by examiner

*Primary Examiner* — Idriss N Alrobaye
*Assistant Examiner* — Richard B Franklin
(74) *Attorney, Agent, or Firm* — Haynes and Boone LLP (57) ABSTRACT

A control module used with a peripheral unit having configuration information through a system bus includes a storage unit, a state machine unit and an event detector. The storage unit is configured to store a program. The state machine unit is configured to operate under the program. The event detector is configured to receive a hardware interrupt signal from the peripheral unit via an additional wire, wherein the event detector triggers the state machine to perform one of storing and retrieving the configuration information respectively to and from the storage unit via the system bus.

17 Claims, 5 Drawing Sheets

CONTROL MODULE FOR DATA RETENTION AND METHOD OF OPERATING CONTROL MODULE

TECHNICAL FIELD

Embodiments in the present disclosure are related to a control module, and more particularly to a control module to retain configuration information and a method of operating the control module.

BACKGROUND

Power gating technology is usually used in a battery-supplied device or a low leakage-requirement system. A specific circuit can be shut down by turning off one or more power gates on the specific circuit having a circuit state, so as to achieve the purpose of low leakage. However, the circuit state is lost because of cutting off the power supply. The circuit state represented by configuration information is not permitted to be lost because that will cause the configuration information to be absent and cause an unknown status of the specific circuit. Usually, a retention flip-flop (FF) cell is adopted to keep the configuration information indicating the circuit state or configuration, and it cooperates with an additional controller such as a power management unit (PMU) to save and restore. A retention FF cell charges another cost and is only for a specific technology node. This will increase the cost of development and restrict the selection of technology. In addition, the retention FF cell has a larger area and current consumption in a power-on state.

Therefore, it is expected that a novel control module and a method can be adopted to store the configuration information when a system changes from an active mode to an idle mode, and to restore the configuration information when the system changes from the idle mode to the active mode. It is also expected that a novel system structure and a method can be adopted to solve both backup of the configuration information and large area and current consumption.

SUMMARY OF EXEMPLARY EMBODIMENTS

In accordance with one embodiment of the present disclosure, a control module is disclosed. The control module used with a peripheral unit having configuration information through a system bus includes a storage unit, a state machine unit and an event detector. The storage unit is configured to store a program. The state machine unit is configured to operate under the program. The event detector is configured to receive a hardware interrupt signal from the peripheral unit via an additional wire, wherein the event detector triggers the state machine to perform one of storing and retrieving the configuration information respectively to and from the storage unit via the system bus.

In accordance with one embodiment of the present disclosure, a method of operating a control module is disclosed. The method for operating a control module having a storage unit and used with a peripheral unit having a hardware interrupt signal and a configuration information through a system bus includes the steps of: providing an additional bus connection, through which the control module receives the hardware interrupt signal; and performing one of storing and retrieving the configuration information respectively to and from the storage unit via the system bus.

In accordance with a further embodiment of the present disclosure, the present invention discloses a control module. The control module has a storage unit and is used with a peripheral unit having a hardware interrupt signal and configuration information through a system bus. The control module includes an additional connection through which the control module receives the hardware interrupt signal, wherein the control module performs one of storing and retrieving the configuration information respectively to and from the storage unit via the system bus.

The above embodiments and advantages of the present invention will become more readily apparent to those ordinarily skilled in the art after reviewing the following detailed descriptions and accompanying drawings.

DETAILED DESCRIPTION OF THE PREFERRED EMBODIMENTS

Figure 1:
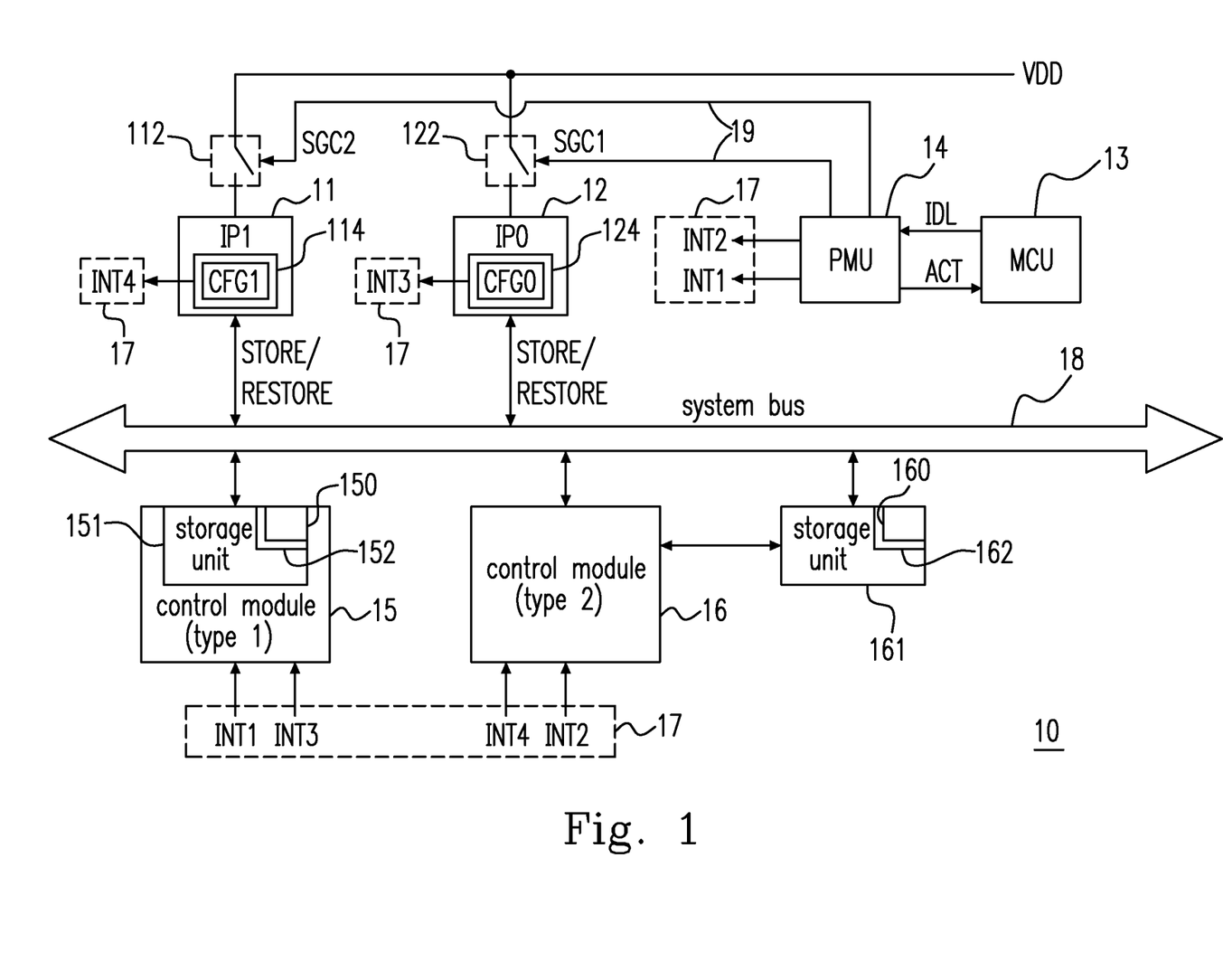
FIG. 1 shows a system for data retention of peripheral units according to the preferred embodiment of the present disclosure.

Please refer to FIG. 1, which shows a system 10 for data retention of peripheral units 11 and 12 according to the preferred embodiment of the present disclosure. The system 10 has an active mode, an idle mode and a system bus 18 includes a peripheral unit 11, a power management unit (PMU) 14, an additional connection 17 and a control module 15. The peripheral unit 11 has configuration information CFG1 representative of a circuit state thereof. The power management unit (PMU) 14 generates a hardware interrupt signal INT1. The additional connection 17 transmits therethrough the hardware interrupt signal INT1. The control module 15 stores the configuration information CFG1 in the internal storage unit 151 in response to the hardware interrupt signal INT1 when the system 10 operates in the idle mode and retrieves the configuration information CFG1 when the system 10 operates in the active mode.

The system 10 further includes a peripheral unit 12, a micro control unit (MCU) 13, a control module 16, a storage unit 161, and a system bus 18. The peripheral unit 11 can be an in-house intellectual property (IP) circuit IP1, and the peripheral unit 12 can be a third-party IP circuit IP0. The third-party IP circuit IP0 usually has no retention DFF, so some external unit must be used to backup its configuration information before it is powered off. The control modules 15 and 16 can be classified into two types, wherein one type has a built-in storage unit 151, and the other type has an external storage unit 161. The additional connection 17 can be a wire connection which is independent from the system bus 18 and is also independent from each wire. In some embodiments, the PMU 14 generates an interrupt signal INT2. The additional connection 17 transmits therethrough the interrupt signal INT2. The control module 16 stores the configuration information CFG1 in the external storage unit 161 in response to the interrupt signal INT2 when the system 10 operates in the idle mode, low power mode or sleep mode and restores the configuration information CFG1 when the system 10 operates in the active mode.

In FIG. 1, each of the storage units 151 and 161 is a relative high-density storage unit. The storage units 151 and 161 respectively include instruction memories (IMs) 152 and 162. The storage units 151 and 161 respectively store programs 150 and 160 in the instruction memories 152 and 162. The peripheral units 12 and 11 respectively have a first circuit state and a second circuit state. The configuration information CFG0 and the configuration information CFG1 are respectively associated with the first and the second circuit states. The control module 15 or 16 is further used with the MCU 13 and the PMU 14. The peripheral unit 12 includes at least one flip-flop register 124 to contain the configuration information CFG0 when the peripheral unit 12 is powered on. The peripheral unit 11 includes at least one flip-flop register 114 to contain the configuration information CFG1 when the peripheral unit 11 is powered on. Each of the storage units 151, 161 includes at least one of a non-volatile storage component or a volatile storage component, wherein the non-volatile storage component includes a flash memory, the volatile storage component includes a static random-access memory (SRAM) Any of the flash memory, the SRAM has a smaller area size than that of any of the flip-flop registers 124 and 114 for the same chip process. Therefore, the present disclosure improves the chip area and chip density of flip-flop registers 124 and 114. In addition, the peripheral units 12 and 11 respectively include the flip-flop registers 124 and 114 to contain the configuration information CFG0 and the configuration information CFG1 respectively when the peripheral units 12 and 11 are respectively powered on, and the SRAM consumes a smaller leakage current than that of any of the flip-flop registers 124 and 114 in the idle mode for the same chip process. Therefore, the present disclosure improves power consumption of the flip-flop registers 124 and 114.

When the system 10 having the system bus 18 enters an idle mode, the MCU 13 outputs an idle signal to the PMU 14 before the MCU 13 is idle; i.e., the MCU 13 informs the PMU 14 first, and then becomes idle. The PMU 14 outputs the hardware interrupt signals INT1 and INT2 respectively to the control modules 15 and 16 via the additional connection 17 in response to receipt of the idle signal IDL. The control modules 15 and 16 respectively store the configuration information CFG0 and CFG1 coming from the peripheral unit 12 and 11 via the system bus 18 in response to receipt of the respective hardware interrupt signals INT1 and INT2. Alternatively, the PMU 14 does not inform the control module 16 to store the configuration information CFG1, and the control module 15 may continue to store other configuration information CFG1. The PMU 14 shuts down the peripheral units 12 and 11 by respectively using gate control signals SGC1 and SGC2 through an independent wire 19 to save power. In some embodiments, metal oxide semiconductor (MOS) switches 122 and 112 can respectively receive the gate control signal SGC1 and SGC2. If the MOS switches 122 and 112 have the same gate power-on and power-off voltages, the independent wire 19 can be integrated as one to share the same gate control signal. When the system 10 and the system bus 18 operate in or enter an active mode, the PMU 14 wakes up the MCU 13 by outputting an active signal ACT to the MCU 13, the PMU 14 powers on the peripheral unit 12 and 11 by respectively using the gate control signal SGC1 and SGC2 through the independent wire 19 and outputs the hardware interrupt signal INT1 and INT2 via the additional connection 17 respectively to the control module 15 and 16, and the control module 15 and 16 respectively restore the configuration information CFG0 and the configuration information CFG1 to the peripheral units 12 and 11 via the system bus 18 in response to receipt of the respective hardware interrupt signal INT1 and INT2. Then, the PMU 14 outputs the active signal ACT to wake up the MCU 13. In some embodiments, the PMU 14 can output the hardware interrupt signal INT1 and INT2 to respectively trigger the control modules 15 and 16 to store the configuration information CFG0 and the configuration information CFG1 according to its built-in timer which is set by the MCU 13 in advance, and thus the PMU 14 lets the system 10 operate in or enter the idle mode within a predetermined period of time. In some embodiments, the PMU 14 can wake up the control module 15 and 16 according to its built-in timer which is set by the MCU 13 in advance, and thus the control module 15 and 16 can respectively restore the configuration information CFG0 and the configuration information CFG1. Please note that the two control modules 15 and 16 do not need to operate at the same time because they are just different types of control module, but it prefers only one control module 15 or 16 is needed to complete the storage and restoration tasks throughout the present disclosure.

Figure 2:
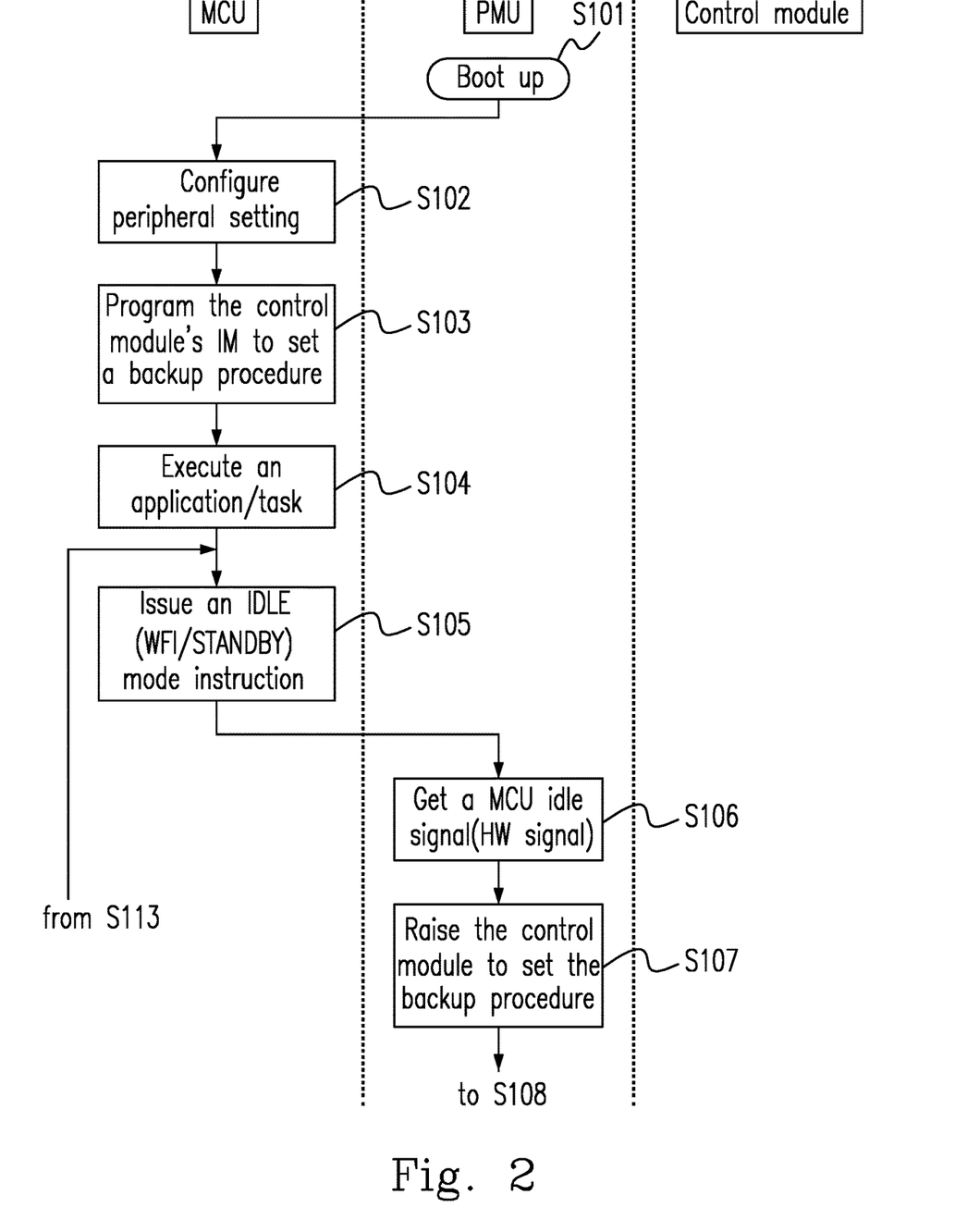
FIG. 2 shows preparation before backup and restoration of the configuration information according to the preferred embodiment of the present disclosure.

Please refer to FIG. 2, which shows the preparation before backup and restoration of the configuration information CFG0 according to the preferred embodiment of the present disclosure. Please refer to FIGS. 1 and 2, in step S101, the PMU 14 boots up. In step S102, the MCU 13 configures the peripheral units 12 setting. In step S103, the MCU 13 programs the IM 152 of the control module 15 to set a backup procedure. In step S104, the MCU 13 executes an application or a task. In step S105, the MCU 13 issues the idle signal IDL by a WFI (wait for interrupt) instruction or a standby instruction. In step S106, the PMU 14 gets an idle signal IDL from the MCU 13. In step S107, the PMU 14 raises an interrupt to notice the control module 15 to set the backup procedure. Please note that the MCU 13 is idle after it issues the idle signal IDL to the PMU 14, and the PMU 14 takes over the job of the MCU 13, and thus system software does not need to instruct the MCU 13 to deal with the backup procedure and can save power because the MCU 13 is usually powerful and complex and consumes more power.

Figure 3:
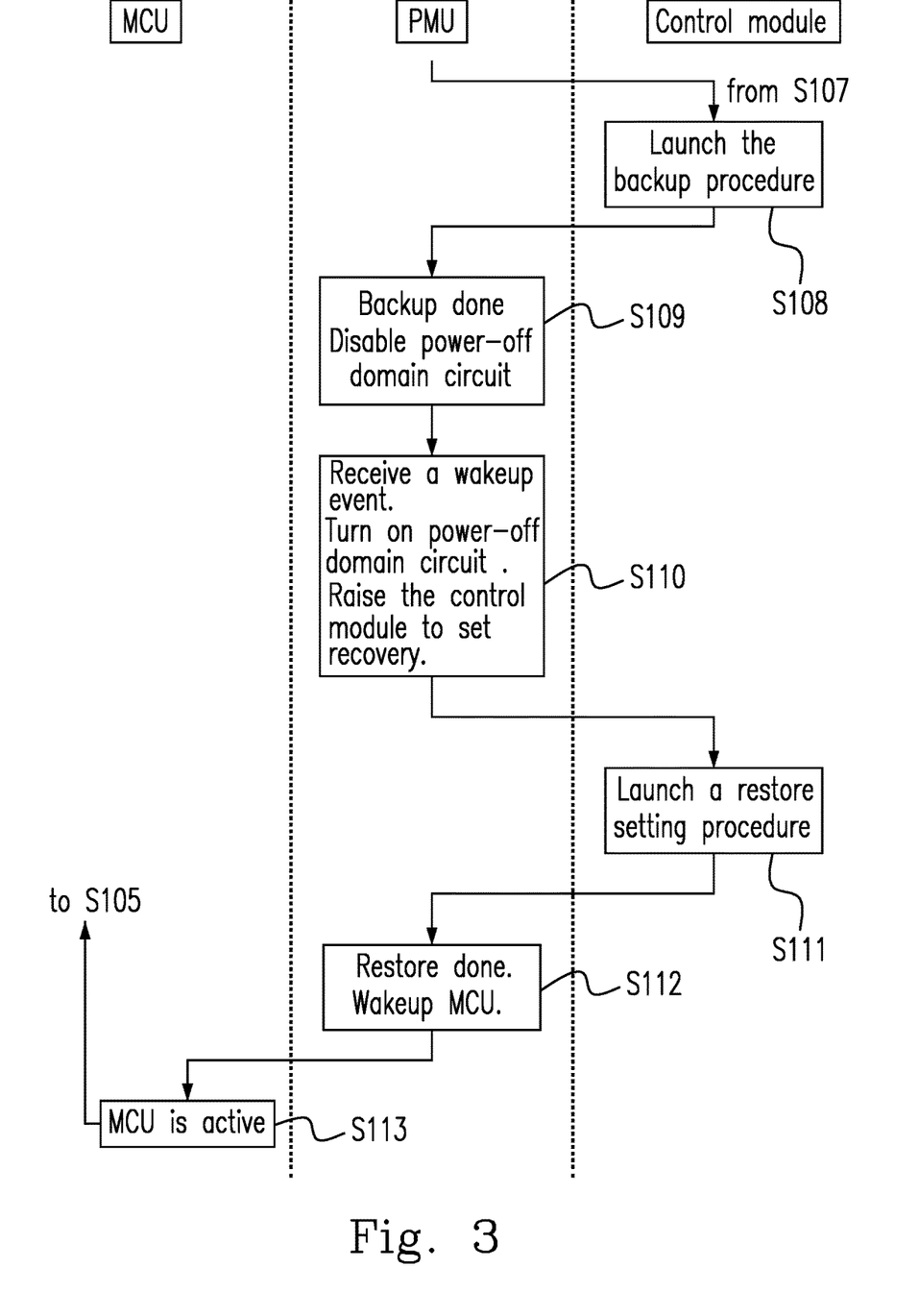
FIG. 3 shows backup and restoration procedures according to the preferred embodiment of the present disclosure.

Please refer to FIG. 3, which shows the backup and restoration procedures according to the preferred embodiment of the present disclosure. In step S108, the control module 15 launches the backup procedure. In step S109, the PMU 14 disables a power-off domain circuit when the backup procedure is complete. For example, the power-off domain circuit includes the in-house IP circuit IP0 and the third-party IP circuit IP1. In step S110, the PMU 14 receives a wake-up event, turns on the power-off domain circuit and raises the control module 15 to start the recovery. The wake-up event may be a timer expire, a keyboard strike, a screen touch or the like. In step S111, the control module 15 launches a restoration procedure. In step S112, the PMU 14 wakes up the MCU 13 when the restore procedure is complete. In step S113, the MCU 13 is active, and then the step flow goes to step S105.

Figure 4:
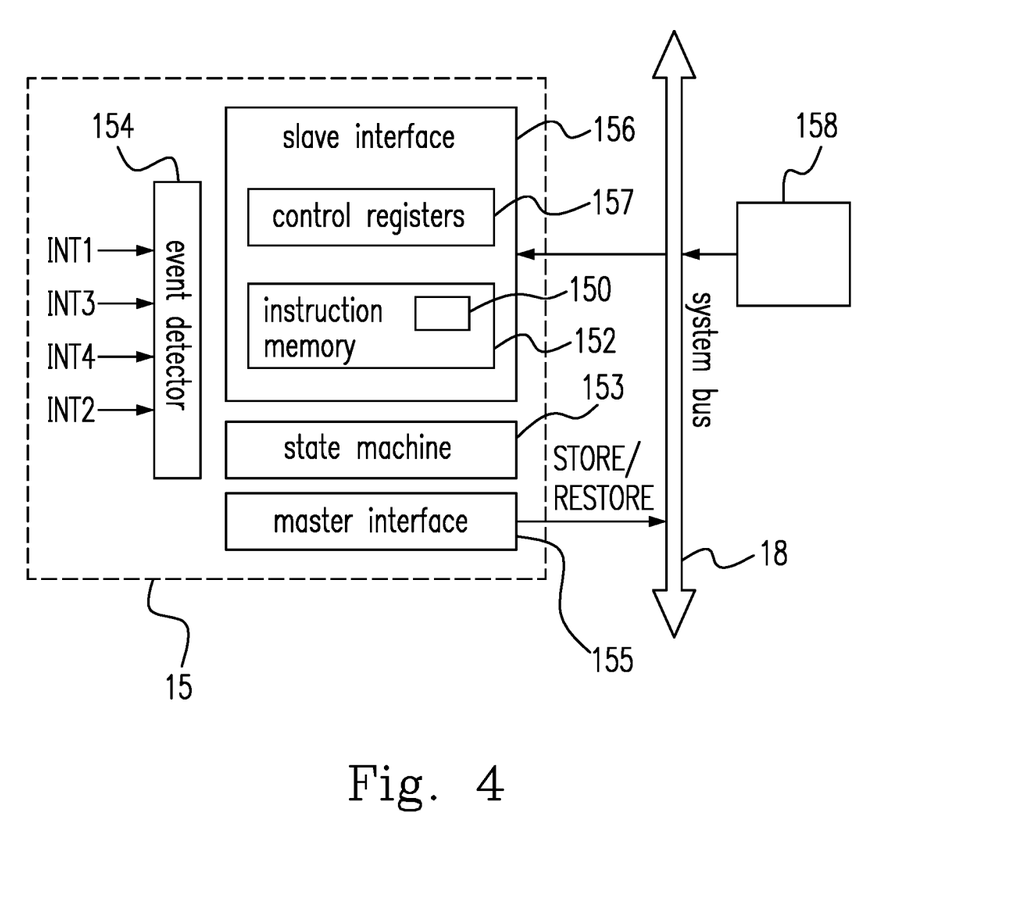
FIG. 4 shows the control module in detail according to the preferred embodiment of the present disclosure.

Please refer to FIG. 4, which shows the control module 15 in detail according to the preferred embodiment of the present disclosure. The control module 15 further includes a state machine unit 153 and an event detector 154. The state machine unit 153 is configured to operate under the program 150. In some embodiments, the event detector 154 is configured to receive the hardware interrupt signals INT3 and INT4 from the peripheral units 12 and 11 respectively via the additional connection 17, wherein the event detector 154 is coupled to the state machine 153, and triggers the state machine 153 to perform one of storing and retrieving the configuration information CFG0 respectively to and from the storage unit 151 via the system bus 18.

Please refer to FIGS. 1 and 4, the program 150 instructs the state machine 153 to store the configuration information CFG0 in the IM 152 via the system bus 18 when the system 10 switches from the active mode to the idle mode, and to restore the configuration information CFG0 from the IM 152 via the system bus 18 when the system 10 switches from the idle mode to the active mode. The control module 15 further includes a master interface 155, a slave interface 156 and a control register 157. The master interface 155 is configured to access the flip-flop register 124 or 114 on the system bus 18 by issuing one of a store and a load command. The slave interface 156 is controlled by a master device 158 on the system bus 18, for example, the MCU 13. The control register 157 is configured by the master device 158 via the slave interface 156 to configure a task arrangement and a trigger event mask setting of the control module 15. The state machine 153 is coupled to the IM 152, the master interface 155 and the slave interface 156. The event detector 154 is configured to trigger the state machine 153 by at least one of events being one selected from a group consisting of a general purpose input output, a timer expiration and an interrupt.

In some embodiments, the control module 15 provides a storage operation and a restoration operation. In the storage operation, the control module 15 will only perform read transactions from the system bus 18 and store the values in its IM 152. A single instruction stored in the IM 152 has two 32-bits parts, one part is for the read address, and the other part is a place-holder to represent the read value. In the restoration operation, the control module 15 will only perform writing transactions through the system bus 18. The instruction format is the same as that for the storage operation, with a 32-bit address and a 32-bit value to write.

Figure 5:
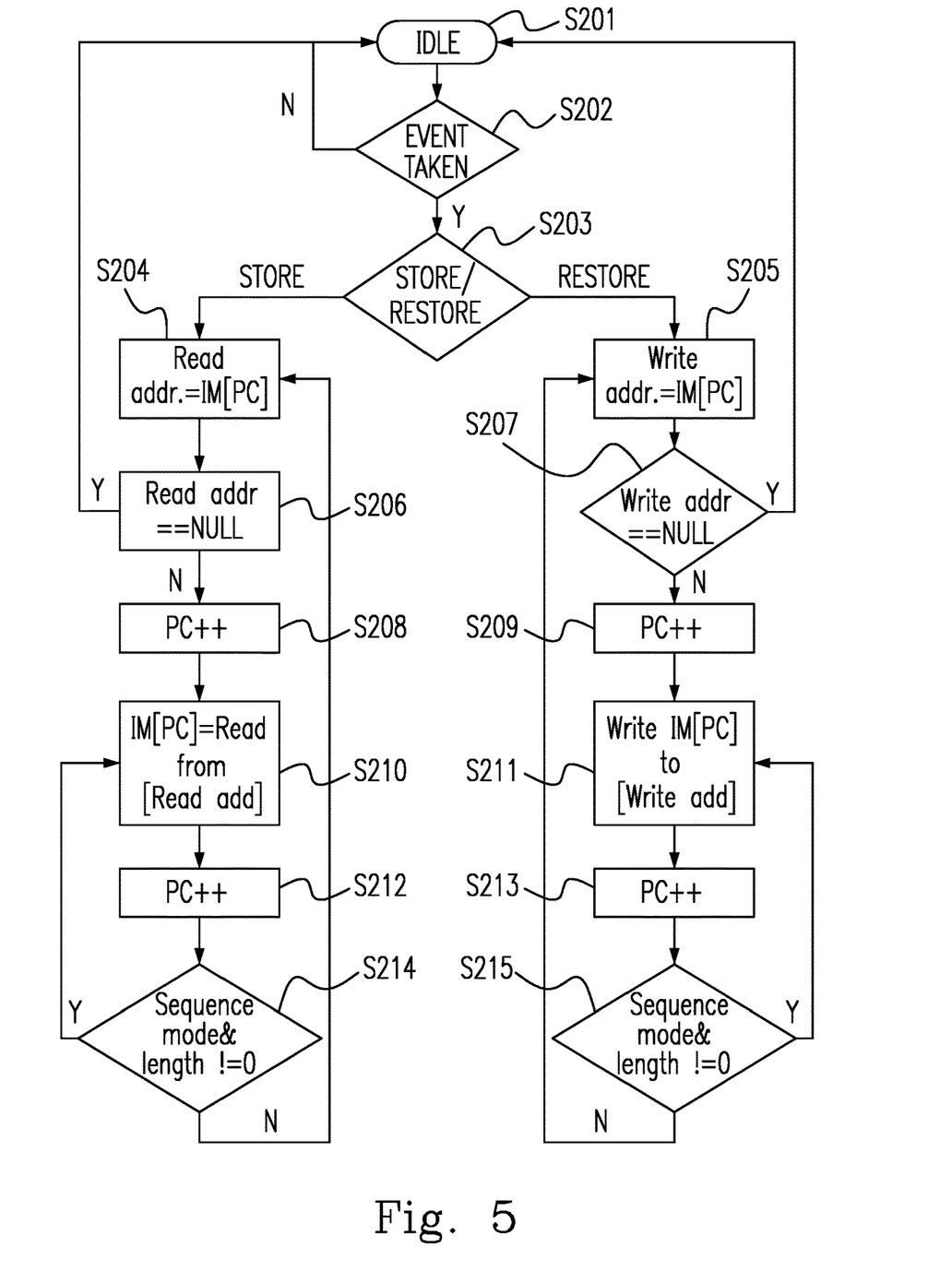
FIG. 5 shows operations of the state machine in the idle mode according to the preferred embodiment of the present disclosure.

Please refer to FIG. 5, which shows the operation of the state machine 153 in the idle mode according to the preferred embodiment of the present disclosure. The state machine 153 is a finite state machine (FSM) and can perform the storage and the restoration operations under the program 150. Please return to FIG. 1, the peripheral unit 12 is configured by MCU 13 after the system bus 18 is initialized. and the MCU 13 sets the program 150 that the a start pointer refer to peripheral unit 12 for back up purpose. The program 150 configures the peripheral unit 12 to determine a pointer address indicating where the configuration information CFG0 is when the system 10 is powered on, and when the system 10 is initiated, the pointer address is stored at a first address of the instruction memory 152. Please refer to FIGS. 4 and 5, in step S201, when the system 10 operates in the idle mode, the step flow goes to step S202. In step S202, a first decision is made on whether any event is detected by the event detector 154. When the first decision is positive, the step flow goes to step S203; when the first decision is negative, the step flow returns to step S201. In step S203, the event detector 154 detects the hardware interrupt signal INT1 to determine which operation should be performed. When the storage operation is performed, the step flow goes to step S204; when the restoration operation is performed, the step flow goes to step S205. For example, the hardware interrupt signal INT1 may include two kinds of enable signals ENA1-1 and ENA1-2 (not shown), the enable signal ENA1-1 can enable and disable the storage operation, and the enable signal ENA1-2 can enable and disable the restoration operation. The enable signals ENA1-1 and ENA1-2 cannot enable both the storage and restoration operations at the same time. In step S204, the state machine 153 performs a read operation to store the configuration information CFG0 from the peripheral unit 12, and the read operation includes the following steps S204, S206, S208, S210, S212 and S214. In step S204, the program 150 instructs the state machine 153 to read the pointer address at the first address. For example, the pointer address is stored at the program counter (PC) of the IM 152 as in step S204. The PC indicates the first address of the IM 152. In step S206, a second decision is made on whether the state machine 153 reads a null pointer address. When the second decision is positive, the step flow returns to step S201; when the second decision is negative, the step flow goes to step S208. In step S208, the PC of the IM 152 accumulates an offset value to generate a new PC, i.e., a second address of the IM 152, and then the step flow goes to step S210.

In step S210, the state machine 153 reads the configuration information CFG0 located at the pointer address and stores the configuration information CFG0 at a second address of the instruction memory, wherein the second address is the first address accumulated by a single offset value. In step S212, the PC is accumulated by another offset value and it indicates a third address of the IM 152, and therefore further configuration information may be continuously stored at the third address of the IM 152. For example, the state machine 153 can continue to store the configuration information CFG1 at the third address of the IM 152. In step S214, if a sequence read mode is required, and a memory space referred by the second address is not enough to fit the configuration information CFG0, i.e., some bits of the configuration information CFG0 are left, not stored at the second address of the IM 152, and the length of those bits left is still not zero, then the step flow goes to step S210. If the sequence read mode is not required, and the memory space referred by the second address is enough to fit the configuration information CFG0, i.e., no bit of the configuration information CFG0 is left, and a length of those bits left is zero, then the step flow returns to step S204. In some embodiments, one length equals to 32 bits; and if a sequence read operation is performed, then several lengths may be allocated by the control module 15. Throughout steps S204, S206, S208, S210, S212 and S214, the read operation can be a mix type operation including at least one of a single read and a sequence read operations.

In step S205 of FIG. 5, the restoration operation starts. The state machine 153 performs a writing operation to restore the configuration information CFG0 to the peripheral unit 12, and the writing operation includes steps S205, S207, S209, S211, S213 and S215. The program 150 instructs the state machine 153 to retrieve the configuration information CFG0 at a second address of the IM 152. Then, the state machine 153 retrieves the pointer address at the first address of the IM 152. In step S207, if the pointer address isn't null, then the step flow goes to step S209; if yes, then it returns to step S201. In step S209, the PC of the IM 152 increases by a single offset, such as 4 bytes, i.e., 32 bits. For example, the PC equals to PC+4. In step S211, the state machine 153 writes the configuration information CFG0 to where the pointer address refers. In step S213, the PC of the IM 152 accumulates by another single offset. For example, the PC equals to PC+4+4=PC+8. In step S215, if a sequence writing mode is required, and the retrieval of the configuration information CFG0 at the second address is not completed, i.e., some bits of the configuration information CFG0 are left, not retrieved at the second address of the IM 152, and a length of those bits left is still not zero, then the step flow goes to step S211. If the sequence writing mode is not required, and the retrieval of the configuration information CFG0 at the second address is completed, i.e., no bit of the configuration information CFG0 is left, and a length of those bits left is zero, then the step flow returns to step S205. Throughout steps S205, S207, S209, S211, S213 and S215, the write operation can be a mix type operation including at least one of a single write and a sequence write operations.

In some embodiments, two instances are used for storage and restoration operations. The single read operation causes the control module 15 to store data at one beat per instruction. Please refer to Table 1, which shows a single read operation according to the preferred embodiment of the present disclosure.

TABLE 1

| Operation | IM content | IM Address |
|---|---|---|
| RA | 0050000C | PC + 0 |
| RD | Xxxxxxxx | PC + 4 |
| RA | 00500010 | PC + 8 |
| RD | Xxxxxxxx | PC + 12 |
| RA | 00500020 | PC + 16 |
| RD | Xxxxxxxx | PC + 20 |
| RA | 0 | PC + 24 |

In Table 1, the single read operation causes the control module 15 to store data at one beat per instruction. The control module 15 will execute the following procedure:
1. Read address 0050000C and store the read data in IM [PC+4].
2. Read address 005000010 and store the read data in IM [PC+12].
3. Read address 005000020 and store the read data in IM [PC+20].

In Table 1, the PC is a starting address configured by the program 150. The PC is 4 bytes and is accumulated by a single offset value after each read operation, wherein the single offset value is 4 bytes. The symbol "xxxxxxxx" represents an unknown state because the configuration information CFG0 has not yet been stored in the IM 152. For the first single read operation, when the system 10 is powered on, the pointer address 0050000C is stored in IM content referred by IM address PC+0. Then, the control module 15 reads the configuration information CFG0 referred by the pointer address 0050000C, and stores the configuration information CFG0 to IM content referred by the IM address PC+4. Similarly, the second single read operation and the third single read operation are processed in the same way.

Please refer to Table 2, which shows a single writing operation according to the preferred embodiment of the present disclosure.

TABLE 2

| Operation | IM content | IM Address |
|---|---|---|
| WA | 0050000C | PC + 0 |
| WD | 11111111 | PC + 4 |
| WA | 00500010 | PC + 8 |
| WD | 22222222 | PC + 12 |
| WA | 00500020 | PC + 16 |
| WD | 33333333 | PC + 20 |
| WA | 0 | PC + 24 |

In Table 2, the single writing operation causes the control module 15 to restore data at one beat per instruction. The control module 15 will execute the following procedure:
1. Write the configuration information 0x11111111 to the pointer address 0050000C.
2. Write the configuration information 0x22222222 to the pointer address 00500010.
3. Write the configuration information 0x33333333 to the pointer address 00500020.

In Table 2, the write operation is a reverse operation of the read operation and restores the configuration information CFG0 to the peripheral unit 12. In the first write operation, the program 150 instructs the state machine 153 to retrieve the configuration information 11111111 at IM address PC+4. The state machine 153 retrieves the pointer address 0050000C at IM address PC+0. The state machine 153 writes the configuration information 11111111 to where the pointer address 0050000C refers. Thus, the control module 15 completes restoration of the configuration information CFG0 to the peripheral unit 12. Similarly, the second single write operation and the third single write operation are processed in the same way.

The sequence read or write operation can reduce the memory size usage of the IM 152 using the continuous access. It causes the control module 15 to store or restore multiple data per instruction. Please refer to Table 3, which shows a sequence of read operations according to the preferred embodiment of the present disclosure.

TABLE 3

| Operation | IM content | IM Address |
|---|---|---|
| RA | 005000CF | PC + 0 |
| RD | xxxxxxxx | PC + 4 |
| RD | xxxxxxxx | PC + 8 |
| RD | xxxxxxxx | PC + 12 |
| RD | xxxxxxxx | PC + 16 |
| RD | xxxxxxxx | PC + 20 |
| RD | xxxxxxxx | PC + 24 |
| RD | xxxxxxxx | PC + 28 |
| RD | xxxxxxxx | PC + 32 |
| RA | 0 | PC + 36 |

In some embodiments, the pointer address 005000CF includes control bits that can determine whether the read operation is a single read operation or a sequence read operation, and determine how many beats should be performed in one sequence read operation. For example, the hexadecimal bits "CF" in the pointer address 005000CF can be translated to the binary bits "11001111". The bit 0 is one binary value "1" specifying that the sequence read operation is performed. The bits 1 to 5 are five binary values "0111" specifying the storage count is seven decimals. This indicates that the program 150 makes the control module 15 to read the pointer address 00500000 and store the configuration information CFG0 at IM address PC+4, and then continue to store other configuration information starting from IM address PC+8 for seven times. For example, the next pointer address will add 4 automatically, the control module 15 stores the read data referred by the next pointer address 005000C4 in IM content of IM address PC+8, and repeat the above operation seven times. Therefore, the total storage counts is eight beats in one sequence read. The sequence read operation is disabled when the eight-beat storage actions is completed.

The storage and the restoration operations provide both single and sequence modes. The program 150 can set an arbitrary single or sequence storage/restoration operation for a particular purpose. Single mode provides basic access operation, and the sequence mode has better memory utilization. The program 150 can mix the two types of mode operation to achieve the intention of consecutive access and lower the memory size usage.

Please refer to Table 4, which shows a mixed mode of single and sequence mode operations according to the preferred embodiment of the present disclosure.

TABLE 4

| Operation | IM content | IM Address |
|---|---|---|
| RA | 0050000C | PC + 0 |
| RD | xxxxxxxx | PC + 4 |
| RA | 005000C5 | PC + 8 |
| RD | xxxxxxxx | PC + 12 |
| RD | xxxxxxxx | PC + 16 |
| RD | xxxxxxxx | PC + 20 |
| RA | 00500085 | PC + 24 |
| RD | xxxxxxxx | PC + 28 |
| RD | xxxxxxxx | PC + 32 |
| RD | xxxxxxxx | PC + 36 |
| RA | 00500090 | PC + 40 |
| RD | xxxxxxxx | PC + 44 |
| RA | 0 | PC + 48 |

In Table 4, the procedure of the mixed mode is as follows:
1. A single storage operation is performed. Read the pointer address 0050000C and store the read data in IM content of IM [PC+4].
2. A sequence storage operation is performed. Read the pointer addresses 00500000 to 00500008 and store the read data in IM contents of IM address IM [PC+12], [PC+16] and [PC+20] respectively.
3. A sequence storage operation is performed. Read the pointer addresses 00500080 to 00500088 and store the read data in IM contents of IM address IM [PC+28], [PC+32] and [PC+36] respectively.
4. A single storage operation is performed. Read address 00500090 and store the read data in IM content of IM address IM [PC+44].

Embodiments

1. A control module used with a peripheral unit having configuration information through a system bus includes a storage unit, a state machine unit and an event detector. The storage unit is configured to store a program. The state machine unit is configured to operate under the program. The event detector is configured to receive a hardware interrupt signal from the peripheral unit via an additional wire, wherein the event detector triggers the state machine to perform one of storing and retrieving the configuration information respectively to and from the storage unit via the system bus.
2. The module in Embodiment 1, wherein the storage unit is a relative high-density storage unit. The configuration information is associated with a circuit state of the peripheral unit. The system bus is electrically connected to the peripheral unit and the control module, wherein the program instructs the state machine to store the configuration information in the relative high-density storage unit via the system bus when the system switches from an active mode to an idle mode, and to restore the configuration information from the relative high-density storage unit via the system bus when the system switches from the idle mode to the active mode.
3. The module of any one of Embodiments 1-2, wherein the peripheral unit includes at least a flip-flop register to contain the configuration information when the circuit is powered on, the storage unit includes at least one of a non-volatile storage component and a volatile storage component, wherein the non-volatile storage component includes a flash memory, the volatile storage component includes a static random-access memory (SRAM), and any of the flash memory, the SRAM has a smaller area size than that of the flip-flop register.
4. The module of any one of Embodiments 1-3, wherein the peripheral unit includes a flip-flop register to contain the configuration information when it is powered on, and the storage unit includes at least one of an SRAM which consumes a smaller leakage current than that of the flip-flop register in the idle mode.
5. The module of any one of Embodiments 1-4, wherein the peripheral unit includes a flip-flop register to contain the configuration information when it is powered on, and the control module further includes a master interface, a slave interface and a control register. The master interface is configured to access the flip-flop register on the system bus by issuing one of a store and a restoration command. The slave interface is configured to be controlled by a master device on the system bus. The control register is configured by the master device via the slave interface to store a task arrangement, a trigger event mask setting and a status of the control module. The event detector is configured to trigger the state machine by at least one of events being one selected from a group consisting of a general purpose input output, a timer expiration and an interrupt.
6. The module of any one of Embodiments 1-5, wherein the storage unit is a relative high-density storage unit including an instruction memory. The program configures the peripheral unit to determine a pointer address indicating where the configuration information is, and when the system is initiated, the pointer address is stored at a first address of the instruction memory. The state machine performs a read operation to store the configuration information from the peripheral unit, and the read operation includes: The program instructs the state machine to read the pointer address at the first address. The state machine reads the configuration information located at the pointer address and storages the configuration information at a second address of the instruction memory, wherein the second address is the first address accumulated by a single offset value. The read operation includes at least one of a single read and a sequence of read operations.
7. The module of any one of Embodiments 1-6, wherein the storage unit is a relative high-density storage unit including an instruction memory. The program configures the peripheral unit to determine a pointer address indicating where the configuration information is, and when the system is initiated, the pointer address is stored at a first address of the instruction memory. The state machine performs a write operation to restore the configuration information to the peripheral unit, and the write operation includes: The program instructs the state machine to retrieve the configuration information at a second address of the instruction memory. The state machine retrieves the pointer address at the first address of the instruction memory. The state machine writes the configuration information to where the pointer address refers. The control module completes restoration of the configuration information to the peripheral unit. The write operation includes at least one of a single write and a sequence of write operations.
8. A method for operating a control module having a storage unit and used with a peripheral unit having a hardware interrupt signal and configuration information through a system bus includes the steps of: providing an additional bus connection, through which the control module receives the hardware interrupt signal; and performing one of storing and retrieving the configuration information respectively to and from the storage unit via the system bus.

9. The method in Embodiment 8, wherein the control module receives the hardware interrupt signal from a power management unit (PMU), the PMU receives a standby signal or an idle signal from a micro control unit (MCU) electrically connected to the system bus, and the method further comprises the following steps: outputting the standby signal or the idle signal to the PMU once the PMU enters an idle mode; outputting the hardware interrupt signal to the control module to perform a storage task in response to receipt of the standby signal and the idle signal; storing the configuration information in the storage unit in response to receipt of the hardware interrupt signal via the additional connection; and powering off the peripheral unit in response to completion of the storage task.

10. The method of any one of Embodiment 8-9, wherein the control module receives the hardware interrupt signal from a power management unit (PMU), the PMU receives a power-down signal from a micro control unit (MCU) electrically connected to the system bus, and the method further comprises the following steps: waking up the PMU upon the PMU enters an active mode; outputting the hardware interrupt signal to the control module to perform a restoration task in response to receipt of the wake-up signal; powering on the peripheral unit in response to receipt of the interrupt signal via the additional connection; and restoration the configuration information to the peripheral unit to complete the restore task when the peripheral unit is powered on.

11. The method of any one of Embodiments 8-10, wherein the storage unit includes an instruction memory, and the method further comprises the following steps: programming the instruction memory to set up a backup procedure; the MUC configuring the peripheral unit after the system bus is initialized and the MCU set the program that the a start pointer refer to peripheral unit for back up purpose configuring to store a task arrangement, a trigger event mask setting and a status of the control module in the control register; detecting whether at least one of events of being one of selected from a group consisting of a general purpose input output, a timer expiration and an interrupt occurs in response to receipt of the interrupt signal; and processing the backup procedure under the program in response to receipt of the interrupt signal.

12. The method of any one of Embodiments 8-11, wherein the control module further includes a state machine, the storage unit includes an instruction memory, and the method further comprises the following steps: configuring the peripheral unit to determine a pointer address indicating where the configuration information is, and when the system is initiated, the pointer address is stored at a first address of the instruction memory; the state machine performs a read operation to store the configuration information from the peripheral unit, wherein the read operation includes: instructing the state machine to read the pointer address at the first address; and the state machine reads the configuration information located at the pointer address and stores the configuration information at a second address of the instruction memory, wherein the second address is the first address accumulated by a single offset value; and continuing the read operation when a sequential read is needed.

13. The method of any one of Embodiments 8-12, wherein the storage unit stores a program, and the method further comprises the following steps: writing a pointer address to where a first address of the instruction memory is referred when the program is started, wherein the pointer address indicates where the configuration information is; and writing the configuration information to where a second address of the instruction memory is referred when the system enters the idle mode.

14. The method of any one of Embodiments 8-13, wherein the control module includes a state machine, the storage unit includes an instruction memory, the method further comprises: the state machine performing a write operation to restore the configuration information to the peripheral unit, wherein the write operation includes: instructing the state machine to retrieve the configuration information at a second address of the instruction memory; retrieving the pointer address at the first address of the instruction memory; writing the configuration information to where the pointer address refers, wherein the control module completes restoration of the configuration information to the peripheral unit; and continues the write operating when a sequence of write operation is needed.

15. A control module has a storage unit and is used with a peripheral unit having a hardware interrupt signal and a configuration information through a system bus. The control module includes an additional connection through which the control module receives the hardware interrupt signal, wherein the control module performs one of storing and retrieving the configuration information respectively to and from the storage unit via the system bus.

16. The module in Embodiment 15, wherein the control module is used with a power management unit and the peripheral unit, and the peripheral unit is a silicon intellectual property (IP) module including a flip-flop register through the system bus. The control module further includes a master interface, a slave interface and a control register. The master interface is configured to access the flip-flop register through the system bus by issuing one of a store and a load commands. The slave interface is configured to be controlled by a master device through the system bus, and the slave interface includes. The control register is configured to store a task arrangement, a trigger event mask setting and a status of the controller, and the control register is configured by the master device via the slave interface.

17. The module of any one of Embodiments 15-16, wherein the control module further includes a state machine unit and an event detector. The state machine unit is configured to operate under a program stored in the storage unit. The event detector is configured to trigger the state machine unit by at least one of events being one selected from a group consisting of a general purpose input output, a timer expiration and an interrupt through the additional connection.

18. The module of any one of Embodiments 15-17, wherein the control module further includes a state machine. The control module is further used with a power management unit (PMU), and the peripheral unit is a silicon intellectual property (IP) module including a flip-flop register. The storage unit includes an instruction memory. The master device on the system bus configures the control module to store a program in the instruction memory. The PMU outputs the hardware interrupt signal which indicates a store command to the control module via the additional connection when an idle mode is performed. The program configures the peripheral unit to find a pointer address which indicates where the configuration information is, and when the system is initiated, the pointer address is stored in a first address of the instruction memory. The control module triggers the state machine in response to the interrupt signal, the state machine performs a read operation to store the configuration information from the IP module, and the read operation includes: The program instructs the state machine to read the pointer address at the first address. The state machine reads the configuration information located at the pointer address and stores the configuration information in a second address of the instruction memory, and the second address is the first address accumulated by a single offset value. The read operation includes at least one of a single read and a sequence of read operations.

19. The module of any one of Embodiments 15-18, wherein the control module further includes a state machine. The storage unit includes an instruction memory. The control module is further used with a power management unit (PMU), and the peripheral unit is a silicon intellectual property (IP) module including a flip-flop register. The PMU outputs the hardware interrupt signal indicating a restore command to the control module via the additional connection when an active mode is performed. The program configures the peripheral unit to find a pointer address which indicates where the configuration information is, and when the system is initiated, the pointer address is stored in a first address of the instruction memory. The control module triggers the state machine in response to the interrupt signal, the state machine performs a write operation to restore the configuration information to the IP module, and the write operation includes: the program instructs the state machine to retrieve the configuration information at a second address of the instruction memory; the state machine retrieves the pointer address at the first address of the instruction memory; the state machine writes the configuration information to where the pointer address refers; and the control module completes the restoration of the configuration information to the peripheral unit. The write operation includes at least one of a single write and a sequence write operations.

20. The module of any one of Embodiments 15-19, wherein the control module is further used with a micro control unit (MCU) and a power management unit (PMU). When the system enters an idle mode, the MCU outputs an idle signal to the PMU via the additional connection before the MCU is idle, the PMU outputs the hardware interrupt signal to the control module via the additional connection in response to receipt of the idle signal, the control module stores the configuration information from the peripheral unit via the system bus in response to receipt of the hardware interrupt signal, and the PMU shuts down the peripheral unit using a gate control signal through an independent wire to save power. When the system enters an active mode, the MCU is wakened by an active signal from the PMU, the PMU powers on the peripheral unit using a gate control signal through the independent wire and outputs the hardware interrupt signal via the additional connection to the control module in response to receipt of the active signal, and the control module restores the configuration information to the peripheral unit via the system bus in response to receipt of the hardware interrupt signal.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A control module used with a peripheral unit having a configuration information through a system bus, comprising:
a storage unit configured to store a program;
a state machine unit configured to operate under the program; and
an event detector configured to receive a hardware interrupt signal from the peripheral unit via an additional wire, wherein the event detector triggers the state machine to perform one of storing and retrieving the configuration information respectively to and from the storage unit via the system bus, wherein:
the peripheral unit includes a flip-flop register to contain the configuration information when it is powered on, and the control module further includes:
a master interface configured to access the flip-flop register on the system bus by issuing one of a store and a restoration command;
a slave interface configured to be controlled by a master device on the system bus; and
a control register configured by the master device via the slave interface to store a task arrangement, a trigger event mask setting and a status of the control module; and
the event detector is configured to trigger the state machine by at least one of events being one selected from a group consisting of a general purpose input output, a timer expiration and an interrupt.

2. The module as in claim 1, wherein:
the configuration information is associated with a circuit state of the peripheral unit; and
the system bus is electrically connected to the peripheral unit and the control module, wherein the program instructs the state machine to store the configuration information in the storage unit via the system bus when the system switches from an active mode to an idle mode, and to restore the configuration information from the storage unit via the system bus when the system switches from the idle mode to the active mode.

3. The module as in claim 1, wherein the peripheral unit includes at least a flip-flop register to contain the configuration information when the circuit is powered on, the storage unit includes at least one of a non-volatile storage component and a volatile storage component, wherein the non-volatile storage component includes a flash memory, the volatile storage component includes a static random-access memory (SRAM), and any of the flash memory, the SRAM has a smaller area size than that of the flip-flop register.

4. The module as in claim 1, wherein the peripheral unit includes a flip-flop register to contain the configuration information when it is powered on, and the storage unit includes at least one of an SRAM which consumes a smaller leakage current than that of the flip-flop register in the idle mode.

5. The module as in claim 1, wherein:
the storage unit includes an instruction memory;
the program configures the peripheral unit to determine a pointer address indicating where the configuration information is, and when the system is initiated, wherein the pointer address is stored at a first address of the instruction memory;
the state machine performs a read operation to store the configuration information from the peripheral unit, and the read operation includes:
the program instructing the state machine to read the pointer address at the first address; and
the state machine reading the configuration information located at the pointer address and storing the configuration information at a second address of the instruction memory, wherein the second address is the first address accumulated by a single offset value; and the read operation includes at least one of a single read and a sequence of read operations.

6. The module as in claim 1, wherein:
the storage unit includes an instruction memory;
the program configures the peripheral unit to determine a pointer address indicating where the configuration information is, and when the system is initiated, wherein the pointer address is stored at a first address of the instruction memory;
the state machine performs a write operation to restore the configuration information to the peripheral unit, and the write operation includes:
the program instructing the state machine to retrieve the configuration information at a second address of the instruction memory;
the state machine retrieving the pointer address at the first address of the instruction memory;
the state machine writing the configuration information to where the pointer address refers; and
the control module completing restoration of the configuration information to the peripheral unit; and
the write operation includes at least one of a single write and a sequence of write operations.

7. A method for operating a control module having a storage unit and used with a peripheral unit having a hardware interrupt signal and configuration information through a system bus, comprising the steps of:
providing an additional bus connection, through which the control module receives the hardware interrupt signal; and
performing one of storing and retrieving the configuration information respectively to and from the storage unit via the system bus, wherein the storage unit includes an instruction memory, and the method further comprises the following steps:
programming the instruction memory to set up a backup procedure;
configuring the peripheral unit to write a pointer address to where a first address of the instruction memory is referred;
configuring to store a task arrangement, a trigger event mask setting and a status of the control module in the control register;
detecting whether at least one of events of being one of selected from a group consisting of a general purpose input output, a timer expiration and an interrupt occurs in response to receipt of the interrupt signal; and
processing the backup procedure under the program in response to receipt of the interrupt signal.

8. The method as in claim 7, wherein the control module receives the hardware interrupt signal from a power management unit (PMU), the PMU receives a standby signal or an idle signal from a micro control unit (MCU) electrically connected to the system bus, and the method further comprises the following steps:
outputting the standby signal or the idle signal to the PMU once the PMU enters an idle mode;
outputting the hardware interrupt signal to the control module to perform a storage task in response to receipt of the standby signal or the idle signal;
storing the configuration information into the storage unit in response to receipt of the hardware interrupt signal via the additional connection; and
powering off the peripheral unit in response to completion of the storage task.

9. The method as in claim 7, wherein the control module receives the hardware interrupt signal from a power management unit (PMU), the PMU receives a power-down signal from a micro control unit (MCU) electrically connected to the system bus, and the method further comprises the following steps:
waking up the PMU upon the PMU enters an active mode;
outputting the hardware interrupt signal to the control module to perform a restoration task in response to receipt of the wake-up signal;
powering on the peripheral unit in response to receipt of the interrupt signal via the additional connection; and
restoring the configuration information to the peripheral unit to complete the restoration task when the peripheral unit is powered on.

10. The method as in claim 7, wherein the control module further includes a state machine, the storage unit includes an instruction memory, and the method further comprises the following steps:
configuring the peripheral unit to determine a pointer address indicating where the configuration information is, and when the system is initiated, wherein the pointer address is stored at a first address of the instruction memory;
the state machine performs a read operation to store the configuration information from the peripheral unit, wherein the read operation includes:
instructing the state machine to read the pointer address at the first address; and
the state machine reading the configuration information located at the pointer address and storing the configuration information at a second address of the instruction memory, wherein the second address is the first address accumulated by a single offset value; and
continuing the read operating when a sequential read is needed.

11. The method as in claim 10, wherein the storage unit stores a program, and the method further comprises the following steps:
writing a pointer address to where a first address of the instruction memory is referred when the program is started, wherein the pointer address indicates where the configuration information is; and
writing the configuration information to where a second address of the instruction memory is referred when the system enters the idle mode.

12. The method as in claim 7, wherein the control module includes a state machine, the storage unit includes an instruction memory, and the method further comprises:
the state machine performing a write operation to restore the configuration information to the peripheral unit, wherein the write operation includes:
instructing the state machine to retrieve the configuration information at a second address of the instruction memory;
retrieving the pointer address at the first address of the instruction memory;
writing the configuration information to where the pointer address refers, wherein the control module completes restoration of the configuration information to the peripheral unit; and
continuing the write operating when a sequence of write operation is needed.

13. A control module having a storage unit and used with a peripheral unit having a hardware interrupt signal and configuration information through a system bus, comprising:

an additional connection, through which the control module receives the hardware interrupt signal, wherein the control module performs one of storing and retrieving the configuration information respectively to and from the storage unit via the system bus, wherein:
the control module is used with a power management unit and the peripheral unit and the peripheral unit is a silicon intellectual property (IP) module including a flip-flop register through the system bus;
the control module further includes:
a master interface configured to access the flip-flop register through the system bus by issuing one of a store and a load commands; and
controlled by a master device through the system bus, and including a control register configured to store a task arrangement, a trigger event mask setting and a status of the controller; and
the control register is configured by the master device via the slave interface.

14. The module as in claim 13, wherein:
the control module further includes:
a state machine unit configured to operate under a program stored in the storage unit; and
an event detector configured to trigger the state machine unit by at least one of events being one selected from a group consisting of a general purpose input output, a timer expiration and an interrupt through the additional connection.

15. The module as in claim 13, wherein:
the control module further includes a state machine;
the control module is further used with a power management unit (PMU), and the peripheral unit is a silicon intellectual property (IP) module including a flip-flop register;
the storage unit includes an instruction memory;
a master device on the system bus configures the control module to store a program in the instruction memory;
the PMU outputs the hardware interrupt signal indicating a store command to the control module via the additional connection when an idle mode is performed;
the program configures the peripheral unit to find a pointer address which indicates where the configuration information is, and when the system is initiated, wherein the pointer address is stored in a first address of the instruction memory;
the control module triggers the state machine in response to the interrupt signal, the state machine performs a read operation to store the configuration information from the IP module, and the read operation includes:
the program instructing the state machine to read the pointer address at the first address; and
the state machine reading the configuration information located at the pointer address and storing the configuration information in a second address of the instruction memory, the second address is the first address accumulated by a single offset value; and
the read operation includes at least one of a single read and a sequence of read operations.

16. The module as in claim 13, wherein:
the control module further includes a state machine;
the storage unit includes an instruction memory;
the control module is further used with a power management unit (PMU), and the peripheral unit is a silicon intellectual property (IP) module including a flip-flop register;
the PMU outputs the hardware interrupt signal indicating a restoration command to the control module via the additional connection when an active mode is performed;
the program configures the peripheral unit to find a pointer address which indicates where the configuration information is, and when the system is initiated, wherein the pointer address is stored in a first address of the instruction memory,
the control module triggers the state machine in response to the interrupt signal, the state machine performs a writing operation to restore the configuration information to the IP module, and the writing operation includes:
the program instructing the state machine to retrieve the configuration information at a second address of the instruction memory;
the state machine retrieving the pointer address at the first address of the instruction memory;
the state machine writing the configuration information to where the pointer address refers; and
the control module completing the restoration of the configuration information to the peripheral unit; and
the write operation includes at least one of a single write and a sequence write operations.

17. The module as in claim 13, wherein:
the control module is further used with a micro control unit (MCU) and a power management unit (PMU);
when the system enters an idle mode, the MCU outputs an idle signal to the PMU via the additional connection before the MCU is idle, the PMU outputs the hardware interrupt signal to the control module via the additional connection in response to receipt of the idle signal, the control module stores the configuration information from the peripheral unit via the system bus in response to receipt of the hardware interrupt signal, and the PMU shuts down the peripheral unit using a gate control signal through an independent wire to save power; and
when the system enters an active mode, the MCU is wakened by an active signal from the PMU, the PMU powers on the peripheral unit using a gate control signal through the independent wire and outputs the hardware interrupt signal via the additional connection to the control module in response to receipt of the active signal, and the control module restores the configuration information to the peripheral unit via the system bus in response to receipt of the hardware interrupt signal.

* * * * *

UNITED STATES PATENT AND TRADEMARK OFFICE
CERTIFICATE OF CORRECTION

| | | |
|---|---|---|
| PATENT NO. | : 10,338,664 B2 | Page 1 of 1 |
| APPLICATION NO. | : 15/133467 | |
| DATED | : July 2, 2019 | |
| INVENTOR(S) | : Fabien Petitgrand and Huang-Lun Lin | |

It is certified that error appears in the above-identified patent and that said Letters Patent is hereby corrected as shown below:

On the Title Page

Item (73) Assignee: change "M2 Communication Inc." to --M2Communication Inc.--.

Signed and Sealed this
Fourth Day of February, 2025

Coke Morgan Stewart
*Acting Director of the United States Patent and Trademark Office*